W. C. GUILDER.
FRICTIONAL POWER TRANSMISSION APPARATUS.
APPLICATION FILED SEPT. 18, 1909.

966,012.

Patented Aug. 2, 1910.
4 SHEETS—SHEET 2.

Witnesses.
E. B. Gilchrist.
H. R. Sullivan.

Inventor
Walter C. Guilder
by Thurston Woodward
Attorneys

W. C. GUILDER.
FRICTIONAL POWER TRANSMISSION APPARATUS.
APPLICATION FILED SEPT. 18, 1909.

966,012.

Patented Aug. 2, 1910.
4 SHEETS—SHEET 3.

UNITED STATES PATENT OFFICE.

WALTER C. GUILDER, OF ELYRIA, OHIO, ASSIGNOR TO ARTHUR L. GARFORD, OF ELYRIA, OHIO.

FRICTIONAL POWER-TRANSMISSION APPARATUS.

966,012.     Specification of Letters Patent.     Patented Aug. 2, 1910.

Application filed September 18, 1909. Serial No. 518,436.

*To all whom it may concern:*

Be it known that I, WALTER C. GUILDER, a citizen of the United States, residing at Elyria, in the county of Lorain and State of Ohio, have invented a certain new and useful Improvement in Frictional Power-Transmission Apparatus, of which the following is a full, clear, and exact description.

The object of the present invention is to provide an improved arrangement for the frictional transmission of power.

More particularly, my invention is directed to the arrangement of apparatus for transmission of power to the driving wheels of a moving vehicle; and it has especially been my endeavor to provide means for doing this in a manner which shall be effective, and shall, without strain upon the apparatus, permit the proper relative movement of the driving wheels and the proper change of movement therefor, when desired.

It will be seen that I have accomplished the above and other useful ends by the structure forming the subject of the present application, of which the following is a specification, reference being had to the accompanying drawings, in which—

Figure 1:
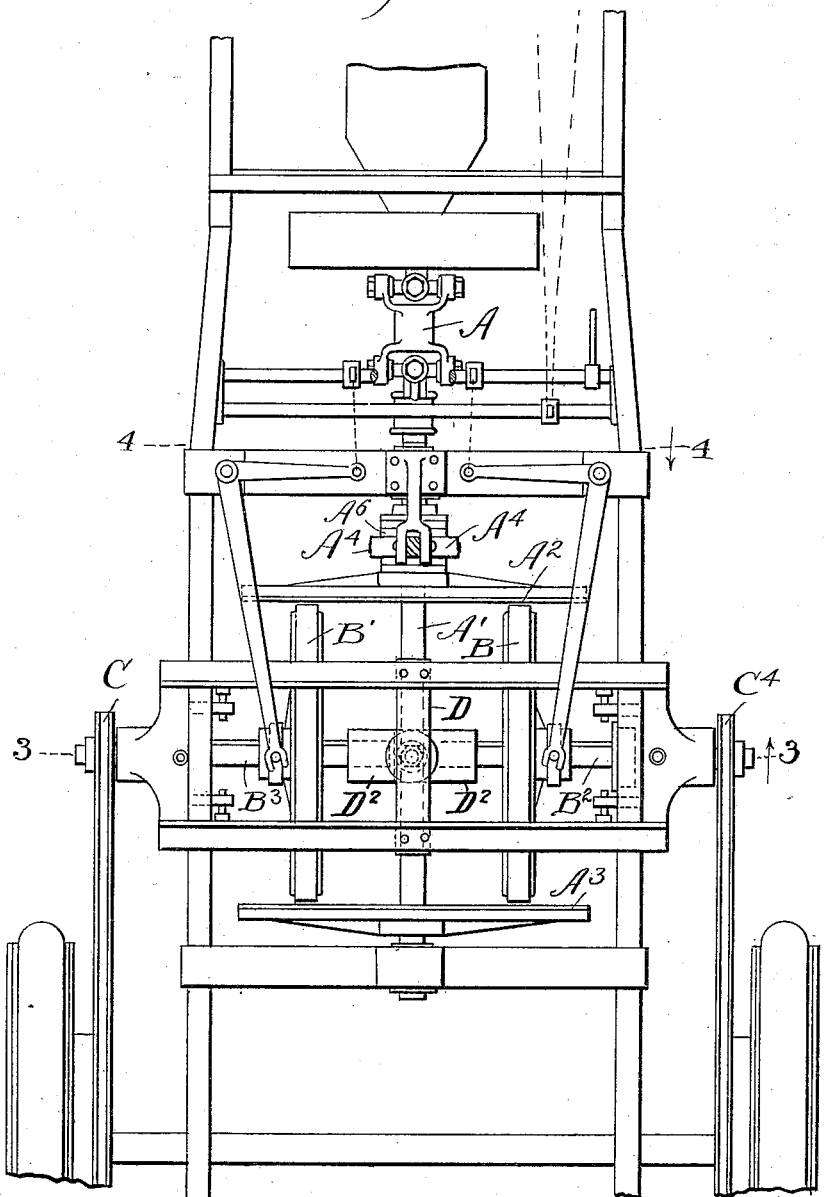
Figure 2:
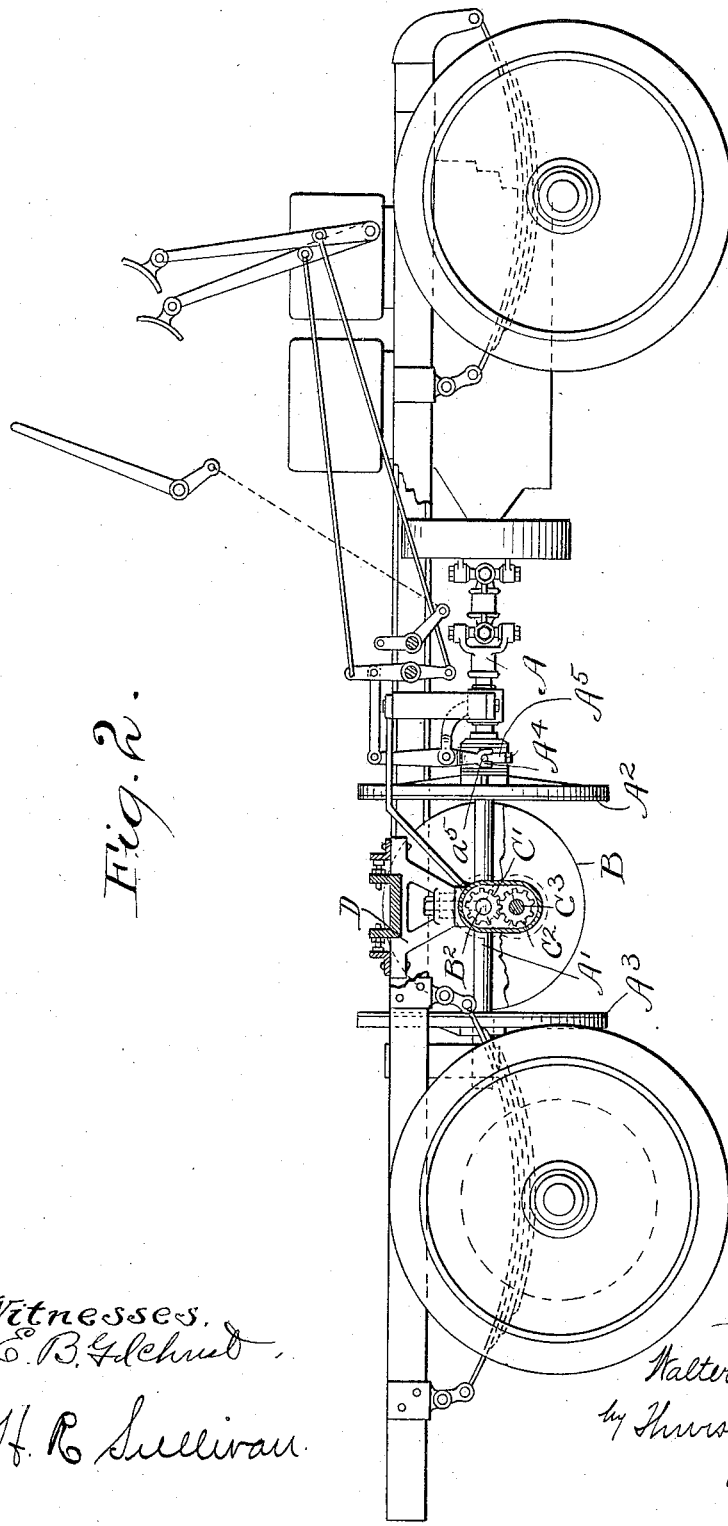
Figure 3:
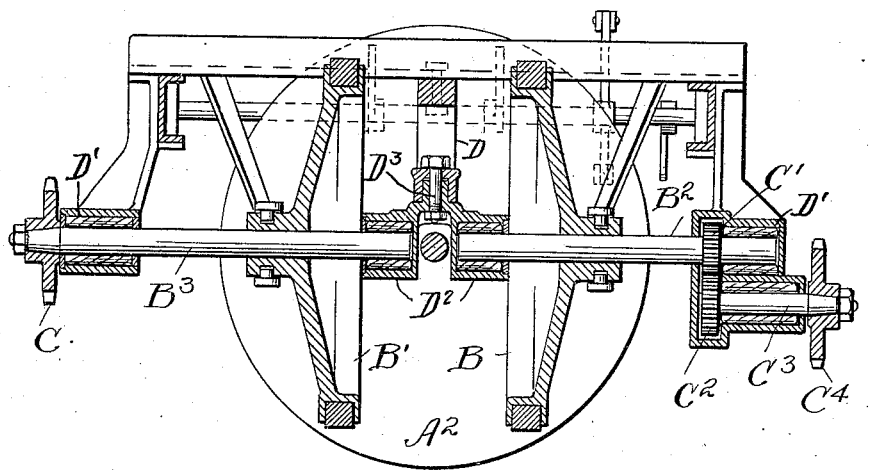
Figure 4:
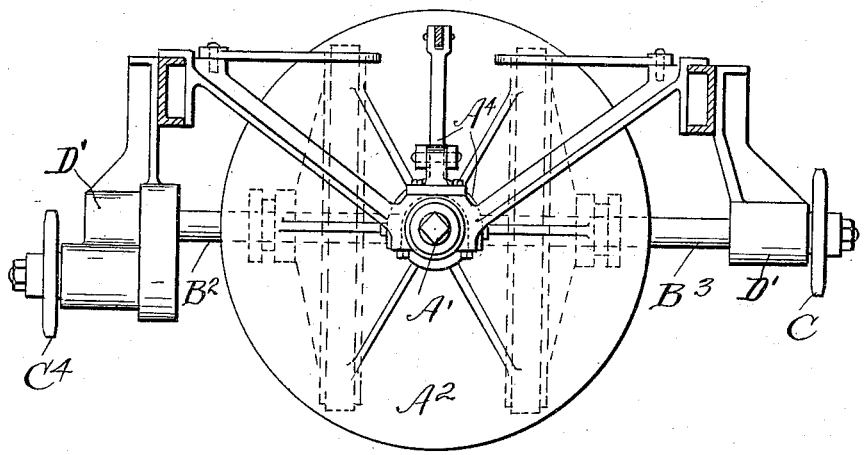
Figure 5:
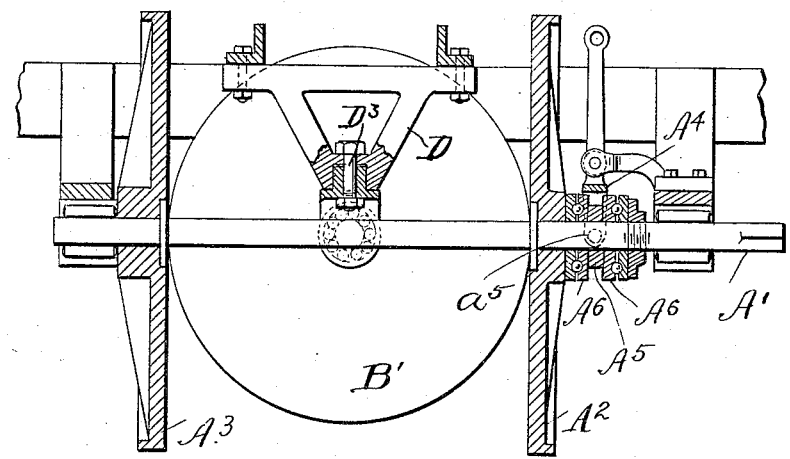

Figure 1 is a plan view of that portion of the chassis of an automobile, on which my improved driving arrangement is mounted. Fig. 2 is a side elevation of an automobile chassis with my driving arrangement. Fig. 3 is a transverse section through the friction rolls taken on the line 3—3 of Fig. 1. Fig. 4 is a transverse section through the frame on the line 4—4 giving an end view of the driving mechanism. Fig. 5 is a detail showing the connection between the quill shaft and the main shaft which together constitute the driving shaft.

The detail structure of the engine and the parts relating thereto is immaterial, but, as shown, the driving shaft is made in two parts, the driving quill shaft A, and the axially alined shaft A', which is squared and is fitted into the squared socket in the end of the quill shaft. This permits longitudinal movement of shaft A' without severing the driving connection between it and the quill shaft. The shaft A' has rigidly keyed thereto two driving disks $A^2$, $A^3$ faced in opposite directions and adapted to bear against a pair of axially alined driving rolls B B' whose axis is at right angles to the axis of said disks,—said rolls lying between said disks and on opposite sides of the axis thereof. The two friction disks $A^2$ $A^3$ are so spaced on the shaft A' that by the movement of the shaft in one direction the forward disk $A^2$ will engage both of the rolls B B', and at the same time the rear disk $A^3$ will be out of engagement therewith. A movement of the shaft A' in the opposite direction will cause the rear friction disk $A^3$ to engage the rolls B B' and the forward disk $A^2$ to move out of engagement therewith. This reciprocation of the shaft A' is controlled by a forked lever $A^4$ which engages pins $a^5$ carried by a collar $A^5$ which is rotatably mounted on said shaft between disks $A^6$ fixed to said shaft. The rolls themselves are each mounted on independent jack shafts $B^2$ $B^3$ placed transversely of the frame and having suitable bearings therein. The jack shafts are mounted near their outer ends respectively in bearings D' fixed to the vehicle frame. The inner ends of said jack shafts are mounted in the two bearings $D^2$ $D^2$ lying on opposite sides of the axis of said disks. These bearings are in the lower end of a yoke D which is connected with a part of the vehicle frame. Preferably this connection is made by means of a vertical pivot bolt $D^3$, which permits, if necessary, a slight turning of said yoke whereby to equalize the pressure of the disks against the two rolls. If the bearings at the outer ends of said jack shafts include spring rollers of familiar form, the yoke can turn upon its supporting bolt to whatever slight extent may be necessary to secure the desired result, without providing for any other movement of said outer bearings. The swiveling of said yoke is not an essential feature of the construction. If the jack shafts are nicely alined, and the rolls of precisely the same diameter, this feature of construction is without any value. But if the alinement of the shafts is not nice enough, or if through wear or otherwise the diameter of the two rolls are not of exactly the same diameter, this swiveling of the yoke adapts the mechanism for automatically adjusting itself to the stated conditions. The rolls B B' have a tongue and groove connection with these jack shafts so as to transmit their rotary motion thereto, but are longitudinally slidable thereon so that the radius length at which they engage the friction driving disks $A^2$ $A^3$ may be varied and consequently their own speed regulated. The jack shaft B³ of one of the rolls B' is rigidly connected with a sprocket C at its outer end, from which sprocket driving connection is had with one of the driving wheels of the machine. The other jack shaft B² has mounted thereon a small gear C' which meshes with a gear C² of similar size,—this second gear being mounted on a short shaft C³ which carries at its outer end a sprocket wheel C⁴ from which driving connection is had with the second driving wheel of the machine. If, now, one friction disk is in engagement with the friction rolls, for example, the one A² which would give the roll B' in Fig. 1 a forward rotation on its upper side, it will be seen that the machine will be driven forward, since the transmission of power through the roll B' will be such as to cause its driving wheel to move in a corresponding direction; and the other friction roll B, though located so as to engage the said driving disk A² at a point diametrically opposite to that where the first roll engages it and therefore be consequently rotated in a direction opposite to that of the first roll, will, nevertheless, by reason of the gears C' C² interposed between it and its sprocket C⁴, transmit a forward motion to the driving wheel controlled by it. Similarly, if the main shaft be shifted so as to bring the second friction disk A³ into engagement with the rolls B B', the direction of rotation of each roll will be opposite to that of the other, and to the direction in which it first rotated, thus securing a backward movement of the car.

It is to be particularly noted that by my arrangement the thrust of each driving disk against the rolls is such that there is no strain or torsion on the disk tending to distort it, as is the case in those arrangements wherein a single roll is used and moved back and forth across the axis of the driving disk in order to obtain a reversal in the direction of movement of the machine.

My arrangement, it will be particularly observed, is likewise an improvement upon those driving connections wherein two driving rolls are used, but one of which bears against a forward disk and one against a rear disk mounted on the same main shaft for the purpose of securing the identity in direction of rotation by these rolls. It will be seen that by interposing the gears C' C² and the short shaft C³ between one of the rolls and the sprocket wheel, that the direction of rotation of the driving wheels become the same in each case and I avoid the awkward and complicated construction of the prior arrangement referred to, which prior construction, additionally, has the disadvantage of placing the driving disks under great stress owing to the unbalanced thrust against the friction rolls.

With my arrangement, which has an exceedingly few number of parts and short connections whereby strength and security may be had, a desired variation of speed is possible by simply moving the friction rolls in or out. Further, no differential gearing need be employed, since the frictional slipping of the two rolls with the driving disk will allow of any relative change in the rate of rotation of the two driving wheels and a reversal of movement may be secured without dislocating any of the bearings or in any way placing an unbalanced or straining thrust upon a moving part.

The above named and other advantages will be obvious to those skilled in the art, and I desire it to be understood that while I do not claim to be the inventor of the broad idea of using two friction disks or two rolls for the purpose of securing the transmission of power, nevertheless the arrangement which I have above distinguished from the prior art I regard as broadly new and capable of certain obvious modifications and rearrangements without departing from the spirit of my invention.

Having described my invention, I claim:

1. In friction driving mechanism, the combination of a driving shaft, an alined longitudinally movable shaft having a driving connection with said driving shaft, two friction driving disks fixed to said longitudinally movable shaft, two axially alined driven shafts whose axis is at right angles to the axis of the longitudinally movable shaft and is located in the same plane, two driven rolls which are located between the two disks on opposite sides of the axis thereof and are longitudinally movable upon said two shafts respectively and have driving connections therewith, means for moving both of said rolls simultaneously and equally toward or away from the axis of said disks, and means for moving the longitudinally movable shaft in both directions whereby either disk thereon is moved into frictional engagement with the peripheries of both rolls.

2. In friction driving mechanism, the combination of a supporting framework, a driving shaft, an alined longitudinally movable shaft having a driving connection with the driving shaft, two disks fixed to said longitudinally movable shaft, two axially alined jack shafts whose axis is at right angles to said longitudinally movable shaft and is located in the same plane, bearings connected with the supporting framework in which the outer ends of said jack shafts are mounted, a yoke swiveled upon a vertical axis from said framework and having two bearings, located on opposite sides of the axis of the longitudinally movable shaft in which the inner ends of said jack shafts are respectively mounted, two driving rolls which are movable axially upon said two jack shafts respectively and have driving connections therewith, means for moving said two rolls simultaneously toward or from each other and the interposed axis of the longitudinally movable shaft, means for moving the longitudinally movable shaft in both directions to carry either disk thereon into frictional engagement with both of said driving rolls.

3. In friction driving mechanism, the combination of two axially alined driving disks which are axially movable, means for turning said disks, two axially alined driven rolls located between said disks and on opposite sides of their axes,—the axis of said rolls being at right angles to the axis of said disks, means for moving the two rolls simultaneously and equally toward and away from each other and the interposed axis of said disks, two shafts which support said rolls, a tongue and groove connection between said shafts and rolls, two bearings for each of said shafts, which bearings are located on opposite sides of the disk which it carries, means for axially moving said disks to carry either into frictional contact with the peripheries of both rolls, two driving wheels, and mechanism intermediate of the two roll-carrying shafts and said wheels whereby the latter are rotated in the same direction.

In testimony whereof, I hereunto affix my signature in the presence of two witnesses.

WALTER C. GUILDER.

Witnesses:
H. R. SULLIVAN,
E. B. GILCHRIST.